United States Patent [19]
Ito et al.

[11] Patent Number: 5,129,637
[45] Date of Patent: Jul. 14, 1992

[54] DEVICE FOR FIXING WORK IN POSITION

[75] Inventors: Takayoshi Ito, Ichinomiya; Takao Kondo, Gifu, both of Japan

[73] Assignees: Infom Co., Ltd.; Kabushiki Kaisha Mori Coating, both of Ichinomiya, Japan

[21] Appl. No.: 746,631

[22] Filed: Aug. 19, 1991

[51] Int. Cl.⁵ ............................................... B25B 1/08
[52] U.S. Cl. ................................... 269/231; 269/235; 269/900
[58] Field of Search ............... 269/99, 100, 48.1, 229, 269/231, 235, 236, 305, 900

[56] References Cited

U.S. PATENT DOCUMENTS

| | | | |
|---|---|---|---|
| 1,685,899 | 10/1928 | Andrew | 269/231 |
| 2,430,613 | 11/1947 | Hodge | 269/231 |
| 2,560,525 | 7/1951 | Nyl | 269/100 |
| 3,473,420 | 10/1969 | Boggs | 269/235 |
| 3,986,383 | 10/1976 | Petteys | 269/48.1 |
| 4,157,819 | 6/1979 | Meyer | 269/231 |

*Primary Examiner*—Robert C. Watson
*Attorney, Agent, or Firm*—Dennison, Meserole, Pollack & Scheiner

[57] ABSTRACT

A device for fixing a work in position on a base having a protrusion and a hole formed adjacent the protrusion for mounting the device. The device includes a rotational member mountable in the hole of the base and rotatable around the axis of the hole. The rotational member has a shank insertable into the hole and a head disposed on an upper end of the shank. The head is provided with a lateral surface for pressing the work against the protrusion. The distance from the rotational axis of the rotational member to the lateral surface is varied in a circumferential direction of the head. The rotational member further includes a first engaging portion for engagement with a tool for rotating the rotational member. A threaded hole is formed to extend from the head to the shank along the rotational axis of the rotational member. A screw member is threadably engaged with the threaded hole of the rotational member and has a second engaging portion for engagement with another tool for rotating the screw member. The shank of the rotational member is provided with an expanding mechanism which is operable by the screw member for expanding laterally so as to prohibit rotation of the rotational member in accordane with the axial movement of the screw member.

11 Claims, 7 Drawing Sheets

DEVICE FOR FIXING WORK IN POSITION

BACKGROUND OF THE INVENTION

1. Field of the Invention

The present invention relates to a device for fixing a work such as a liner guide rail in position.

2. Description of the Prior Art

Figure 12:
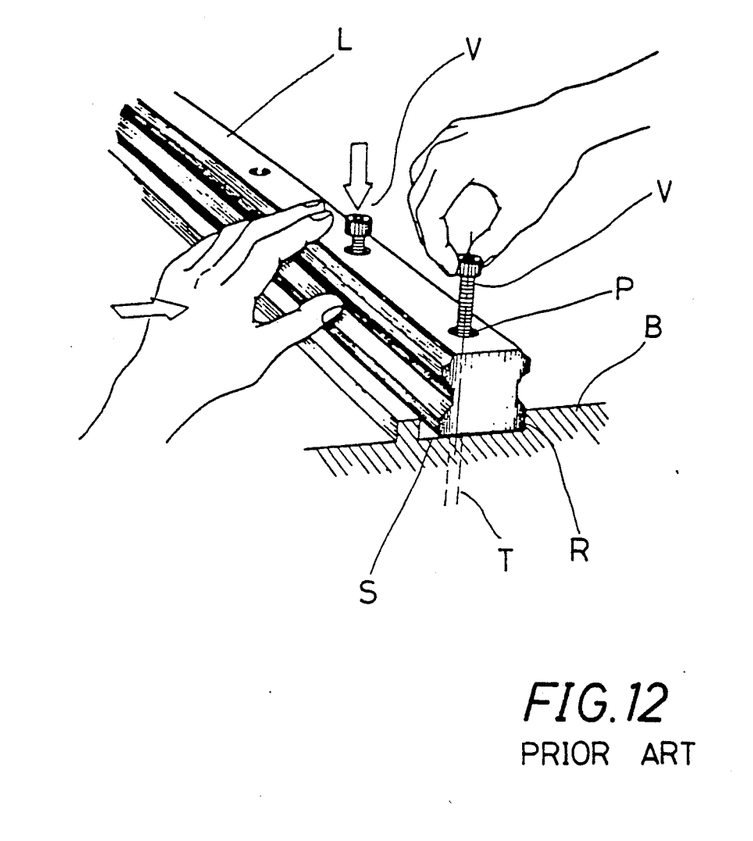
FIG. 12 is a perspective view of a prior art device for fixing a work in position.

A conventional device for fixing a liner guide rail will be hereinafter explained with reference to FIG. 12. In FIG. 12, a linear guide rail L is disposed on a surface S of a base B of a machine such as a machine tool. Recently, such linear guide rails L have also been frequently used in various machines and apparatus other than machine tools. The linear guide rail L is firstly positioned on the surface S of the base B in contact relationship with a reference surface R of the base B perpendicular to the surface S. A plurality of bolts V are subsequently inserted into a plurality of corresponding holes P formed in the linear guide rail L and are threadably engaged with corresponding threaded holes T formed on the base B so as to fix the linear guide rail L to the base B.

With this conventional device, the linear guide rail L may not uniformly contact the reference surface R for the following reasons:

(1) Inherent distortion of the linear guide rail L from linearity.

(2) Tolerance of design of the threaded holes T.

(3) Deformation of the bolts V when they have been tightened.

(4) Discordance of position between the holes P and their corresponding threaded holes T.

The non-uniform contact of the linear guide rail L with the reference surface R may degrade accuracy of positioning of the linear guide rail L, and therefore, the machine element to be guided cannot be linearly moved. Particularly, in case the linear guide rail is one used for guidance of a machine element of a machine tool for precision machining, such degraded positioning accuracy of the linear guide rail may lower the yield of the products and may cause many other drawbacks.

Further, the holes P of the linear guide rail L must be formed at a position precisely coincident with their corresponding threaded holes T, and such machining of the holes P is very troublesome. Additionally, when the linear guide rail L has been damaged or requires to be reformed, it is also necessary to reform the holes P, and such reformation of the holes P cannot be speedily made.

Furthermore, in the fixing operation, the linear guide rail L must be positioned on the base B with the holes P aligned with the corresponding threaded holes T, respectively, and thereafter each of the bolts V is inserted into the corresponding hole P and is threadably engaged with the corresponding threaded hole T. Such operation is very troublesome.

In order to overcome the above-mentioned drawbacks, the prior art has proposed the use of pressing means which are effective for pressing the linear guide rail L laterally toward the reference surface R. The pressing means include a linear projection formed on the base B and extending in parallel with the reference surface R in spaced relation thereto in such a manner that the linear guide rail L may be positioned between the reference surface R and the linear projection. The pressing means further include a plurality of adjusting bolts threadably engaged with the linear projection in a direction perpendicular to the longitudinal direction thereof, so that the forward end of each of the adjusting bolts may be pressed on the corresponding lateral surface of the linear guide rail L so as to reform the same.

However, such a pressing device requires troublesome machining of the base B to form the projection. Further, since the adjusting bolts are to be moved in parallel with the horizontal surface of the base B, the operation of the adjusting bolts must be made within a limited space because of the presence of other machine elements, and in some case, it is not possible to operate the adjusting bolts. Therefore, this device cannot be generally utilized.

SUMMARY OF THE INVENTION

It is, accordingly, an object of the present invention to provide a device for fixing a work in position in which the work can be fixed through rotational operation by an appropriate tool applied from only upwardly of the device, so that the operation can be effectively performed.

It is another object of the present invention to provide a device for fixing a work in position which does not require troublesome machining of the work such as formation of holes, so that the device can be applied to any other works which cannot be machined.

It is a further object of the present invention to provide a device for fixing a work in position which does not require precise positioning of the work before fixing the same, so that the positioning operation can be easily made.

It is a still further object of the present invention to provide a device for fixing a work in position which is suitable for fixing a work such as a long rail-like member while reforming the same by applying a plurality of the devices.

According to the present invention, there is provided a device for fixing a work in position on a base having a protrusion and a hole formed adjacent the protrusion for mounting the device, comprising:

a rotational member mountable in the hole of the base and rotatable around the axis of the hole, the rotational member having a shank insertable into the hole of the base, a head disposed on an upper end of the shank and provided with a lateral surface for pressing the work against the protrusion, the distance from the rotational axis of the rotational member to the lateral surface being varied in a circumferential direction of the head, a first engaging portion for engagement with a tool for rotating the rotational member, and a threaded hole extending from the head to the shank along the rotational axis of the rotational member:

a screw member threadably engaged with the threaded hole of the rotational member and having a second engaging portion for engagement with another tool for rotating the screw member; and expanding mechanism provided with the shank of the rotational member and operable by the screw member for expanding laterally so as to prohibit rotation of the rotational member in accordance with the axial movement of the screw member.

The invention will become more fully apparent from the claims and the description as it proceeds in connection with the drawings.

DETAILED DESCRIPTION OF THE PREFERRED EMBODIMENTS

Figure 1:
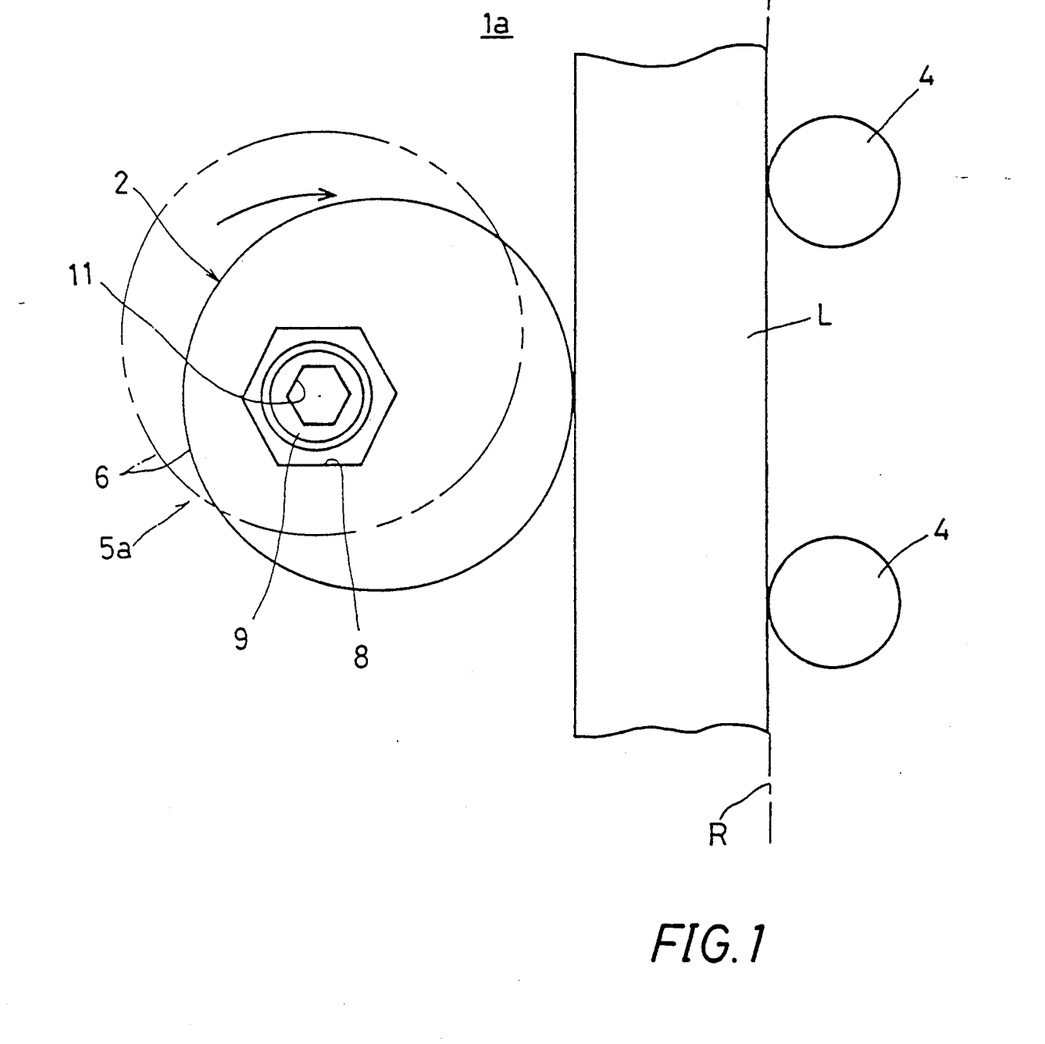
FIG. 1 is a plan view of a device for fixing a work in position according to a first embodiment of the present invention.
Figure 2:
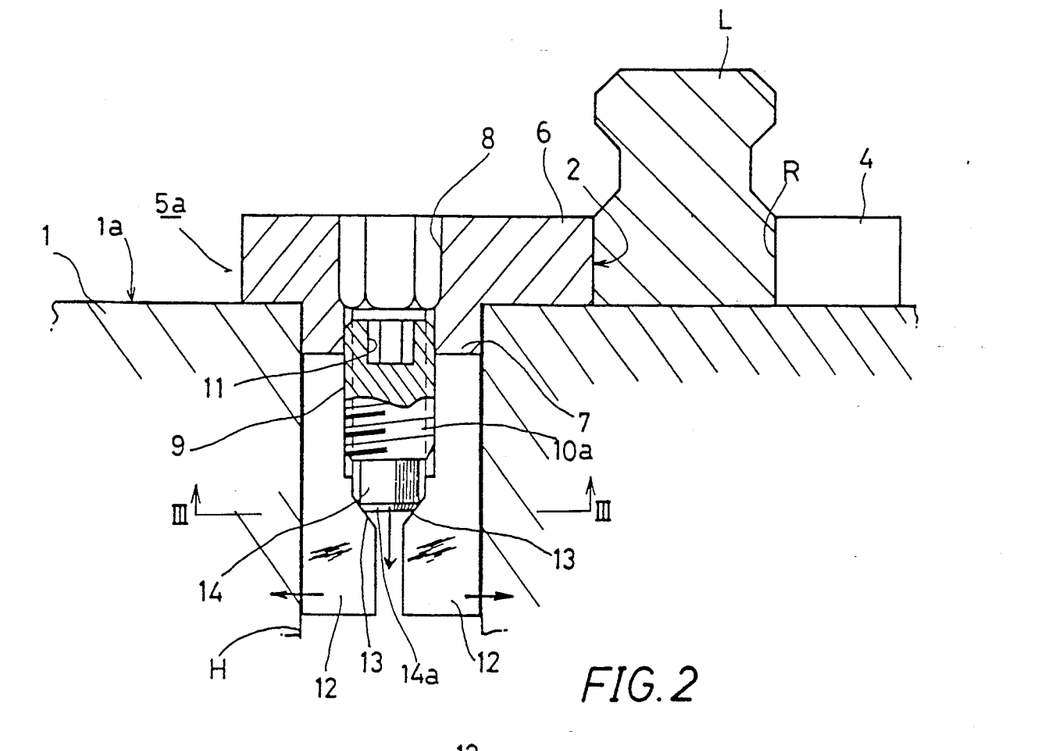
FIG. 2 is a vertical sectional view of FIG. 1.
Figure 3:
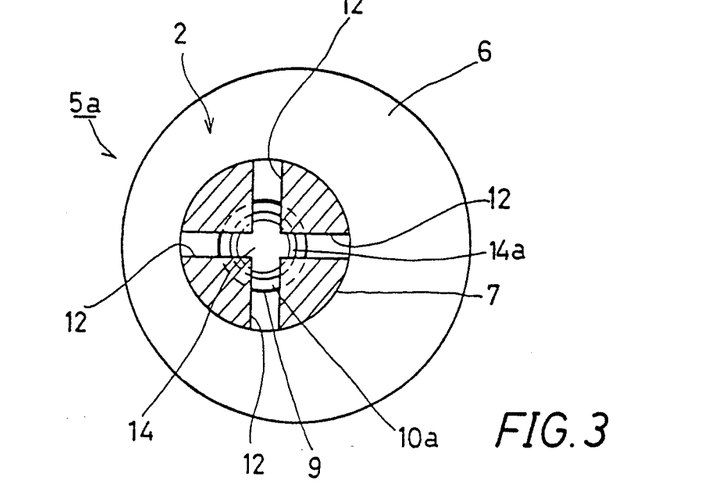
FIG. 3 is a sectional view taken along line III—III in FIG. 2.

Referring to FIGS. 1 to 3, there is shown a device 5a for fixing a work in position according to a first embodiment of the present invention.

A base 1 of a machine such as a machine tool includes a planar surface 1a and is formed with a plurality of holes H for mounting a plurality of the devices 5a (only one assembly of the hole H and the device 5a is shown in the drawings). The base 1 further includes a plurality of cylindrical protrusions 4 extending vertically from the planar surface 1a. The protrusions 4 are positioned in a row along a line and cooperate with each other to engage one side of a liner guide rail L and to define a reference surface R for Positioning the liner guide rail L. The holes H are positioned in series along a line which is parallel with the row of the protrusions 4 and is spaced therefrom at a predetermined distance so as to position the linear guide rail L between the protrusions 4 and the devices 5a. The construction of each of the devices 5a will be hereinafter explained.

The device 5a includes a rotational member 2 having a disc-like head 6 and a shank 7. The shank 7 extends downwardly from the head 6 and is slidably inserted into the hole H, so that the rotational member 2 can be rotated around the axis of the shank 7 or the axis of the hole H. The head 6 is eccentric relative to the shank 7. Thus, the distance between the rotational axis of the rotational member 2 and a lateral surface 6a of the head 6 varies in a circumferential direction. The distance between the head 6 and the reference surface R therefore varies as the rotational member 2 is rotated, so that the lateral surface of the head 6 can be pressed on the opposite side of the linear guide rail L so as to fix the linear guide rail L in position as shown in FIG. 1.

The rotational member 2 includes at the head 6 a hexagonal recess 8 which is located on the axis of rotation of the rotational member 2. Thus, the rotational member 2 may be rotated by applying a hexagon wrench to the hexagonal recess 8. A threaded hole 9 is formed in continuation with the recess 8 and extends along the rotational axis. A screw member 10a is engaged with the threaded hole 9 and is provided with a hexagonal recess 11 at the upper end thereof for rotational operation by the hexagon wrench. A conical hole 9A is formed at substantially the middle position of the shank 7 and is in continuation with the threaded hole 9. The conical hole 9A diminishes in diameter downwardly. A hole 9B having a diameter smaller than that of the threaded hole 9 is formed in continuation with the conical hole 9A and is opened at its lower end. The shank 7 is formed with four slits 12 which extend from a position adjacent the head 6 to the lower end of the shank 7 so as to separate the shank 7 into four equivalent segments joined to each other at their upper ends. The screw member 10a includes at its lower end a non-threaded portion 14. The peripheral portion of the lower end of the non-threaded portion 14 includes a chambered surface 14 for engagement with the conical surfaces 13 of the segments of the shank 7 formed by the conical hole 9A.

The operation of the device 5a of the first embodiment will be hereinafter explained. Firstly, the linear guide rail L is positioned on the base 1 with one side in contact with the protrusions 4. A hexagon wrench is engaged with the hexagonal recess 8 formed on the upper end of the rotational member 2 and is rotated for rotation of the rotational member 2. As the rotational member 2 is rotated, the distance between the head 6 and the linear guide rail L varies, so that the lateral surface of the head 6 is pressed on the other side of the linear guide rail L as previously described.

The hexagon wrench for engagement with the recess 8 is thereafter removed and another hexagon wrench is engaged with the hexagonal recess 11 of the screw member 10a so as to rotate it.

As the screw member 10a is rotated in a direction to be moved downwardly, the non-threaded portion 14 is pressed on the conical inner surfaces 13 of the four segments of the shank 7. As the screw member is further moved downwardly, the segments are resiliently deformed or bent to expand laterally through the cooperation of the chambered surface 14a of the non-threaded portion 14 and the conical inner surfaces 13 of the segments, so that the lower portions of the segments of the shank 7 are pressed on the inner surface of the hole H. Thus, the rotational member 2 is fixed to the hole H, and therefore, the head 6 is kept in position to be pressed on the linear guide rail L.

The other devices 5a disposed at the different positions are subsequently operated in the same manner, so that the linear guide rail L may be kept in position at several positions.

Second to fifth embodiments of the present invention will be hereinafter explained with reference to FIGS. 4 to 11. These embodiments are modifications of the first embodiment, and therefore, the same parts as that of the first embodiment are labeled by the same numerals and the detailed explanation of these parts are omitted.

Figure 4:
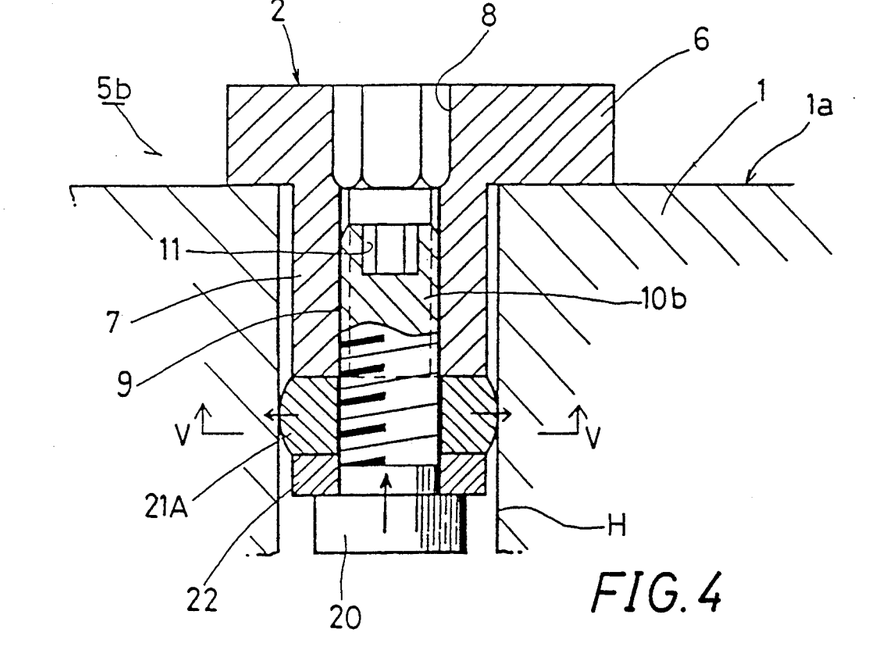
FIG. 4 is a vertical sectional view of a device for fixing a work in position according to a second embodiment of the present invention.
Figure 5:
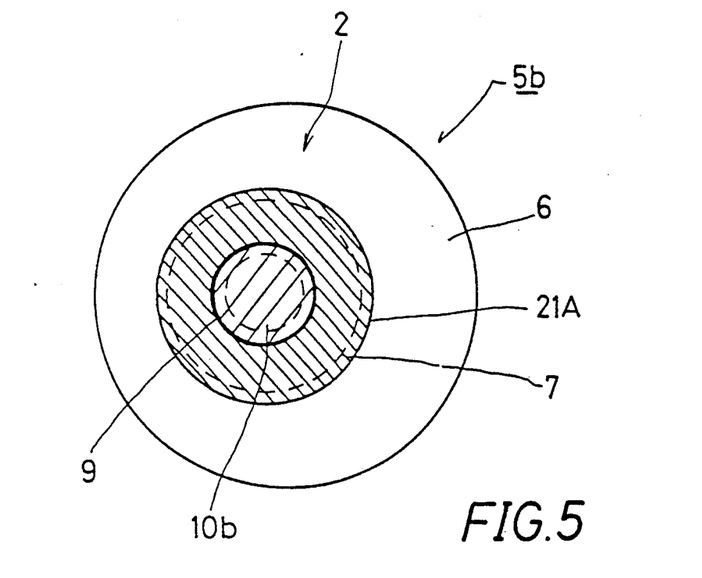
FIG. 5 is a sectional view taken along line V—V in FIG. 4.

The second embodiment of the present invention will be hereinafter explained with reference to FIGS. 4 and 5. A screw member 10b of a device 5b of this embodiment includes a head portion 20 which is integrally formed with the screw member 10b at the lower end thereof and has a diameter larger than that of the screw member 10b. A washer 22 having a diameter larger than that of the head portion 20 is inserted into the screw member 10b and is engaged by the upper surface of the head portion 20. An annular resilient member 21A such as a rubber having relatively large thickness is interposed between the lower end of the shank 7 of the rotational member 2 and the washer 22. The resilient member 21A has a smaller diameter than that of the hole H when it is not loaded, whereas it can be deformed to have a larger diameter when it is pressurized between the shank 7 and the washer 22 or the head portion 20.

In this embodiment, as the screw member 10b is rotated to be moved upwardly, the resilient member 21A is compressed between the lower end of the shank 7 and the washer 22 and increases its outer diameter. The resilient member 21A is therefore pressed on the inner surface of the hole H, so that the rotational member 2 is fixed to the hole H.

Figure 6:
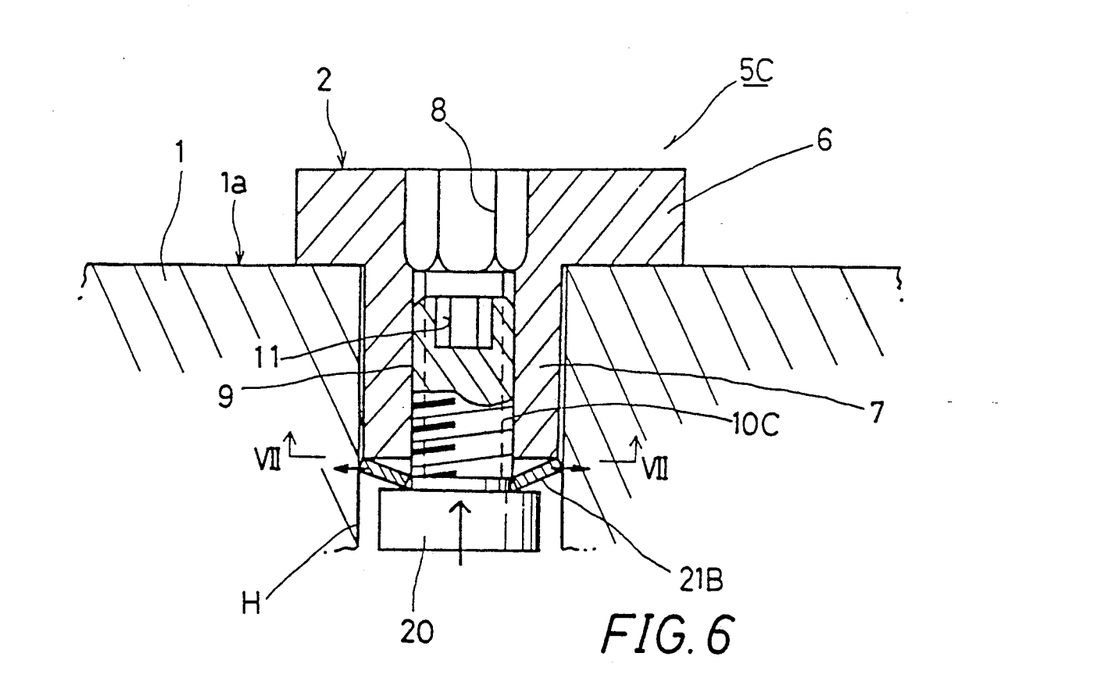
FIG. 6 is a vertical sectional view of a device for fixing a work in position according to a third embodiment of the present invention.
Figure 7:
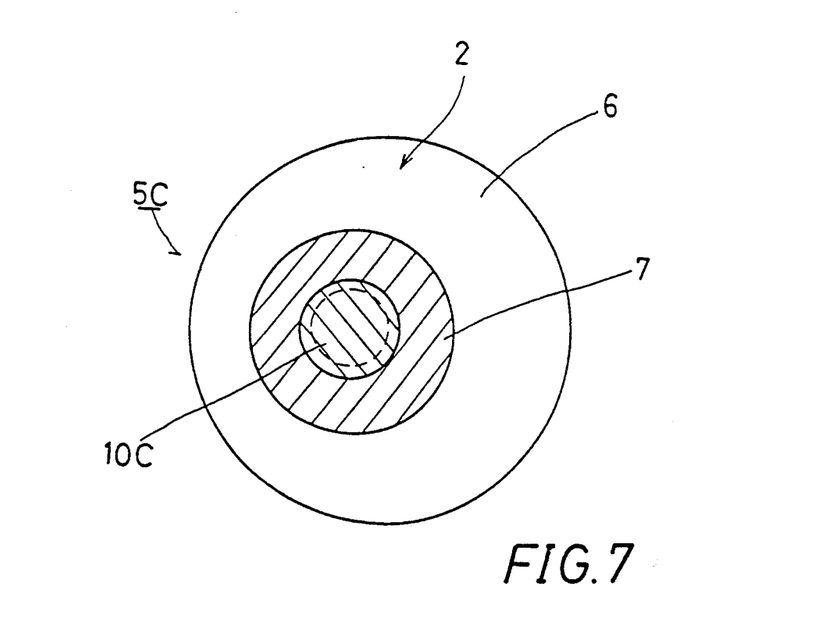
FIG. 7 is a sectional view taken along line VII—VII in FIG. 6.

The third embodiment of the present invention will be hereinafter explained with reference to FIGS. 6 and 7. A device 5c of this embodiment is basically of the same construction as the device 5b of the second embodiment. In this embodiment, a resilient member 21B is a belleville spring interposed between the lower end of the shank 7 and the head portion 20 of a screw member 10c. The resilient member 218 is disposed in such a manner that the inner peripheral portion is supported by the head portion 20 of the screw member 10c. The outer diameter of the resilient member 21B is determined to be smaller than that of the hole H when the resilient member 21B is not loaded, whereas it becomes larger than that of the hole H when the resilient member 21B has been pressurized between the shank 7 and the head portion 20.

In this embodiment, as the screw member 10c is rotated to be moved upwardly, the resilient member 21B is compressed between the lower end of the shank 7 and the head portion 20 of the screw member 10c, so that the resilient member 21B can be pressed on the inner surface of the hole H as the resilient member 21A of the second embodiment.

Figure 8:
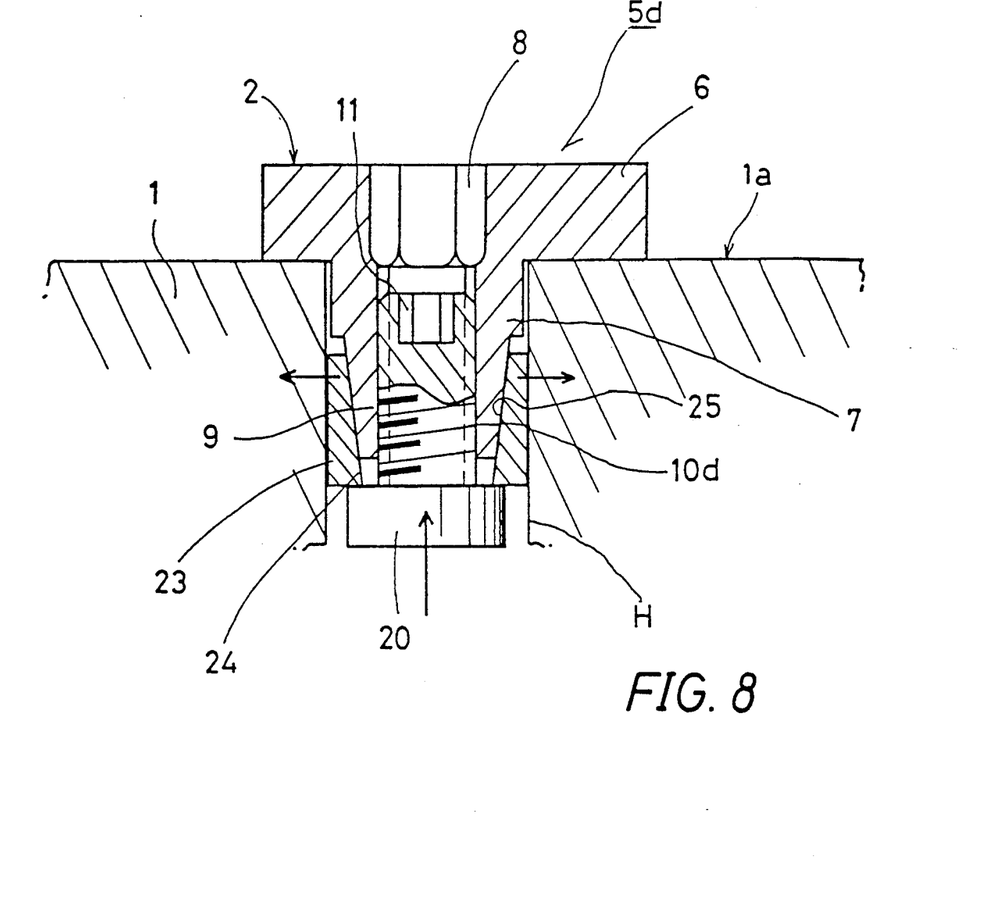
FIG. 8 is a vertical sectional view of a device for fixing a work in position according to a fourth embodiment of the present invention.
Figure 9:
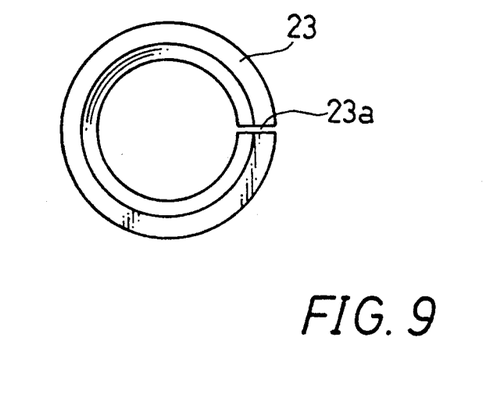
FIG. 9 is a plan view of a tubular member of the device shown in FIG. 8.

The fourth embodiment of the present invention will be hereinafter explained with reference to FIGS. 8 and 9. In the device 5d of this embodiment, a screw member 10d includes the head portion 20 as the second and the third embodiments. The shank 7 of the rotational member 2 of this embodiment includes a conical outer surface 25 formed to have a diameter which becomes smaller in a direction toward the lower end of the shank 7. A tubular member 23 is interposed between the shank 7 and the inner surface of the hole H and is supported its lower end by the head portion 20 of the screw member 10d. The inner surface 24 of the tubular member 23 is formed to have a conical configuration inclined at the same angle as that of the conical outer surface 25 of the shank 7. The tubular member 23 has a slit 23a in a longitudinal direction as shown in FIG. 9. The tubular member 23 has an outer diameter smaller than that of the hole H when it is not loaded.

In this embodiment, as the screw member 10d is rotated to be moved upwardly, the tubular member 23 is also moved upwardly along the shank 7 and is forced to resiliently expand or to increase its diameter through cooperation of its conical inner surface 24 with the outer surface 25 of the shank 7. The tubular member 23 is thus wedged between the outer surface of the shank 7 and the inner surface of the hole H, so that the rotational member 2 can be fixed to the hole H.

Figure 10:
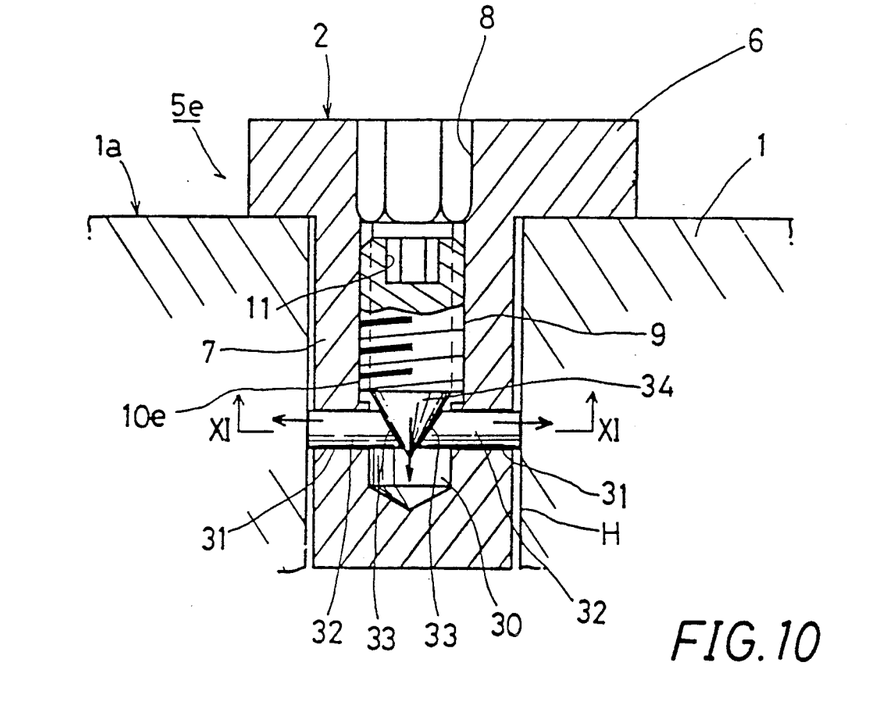
FIG. 10 is a vertical sectional view of a device for fixing a work in position according to a fifth embodiment of the present invention.
Figure 11:
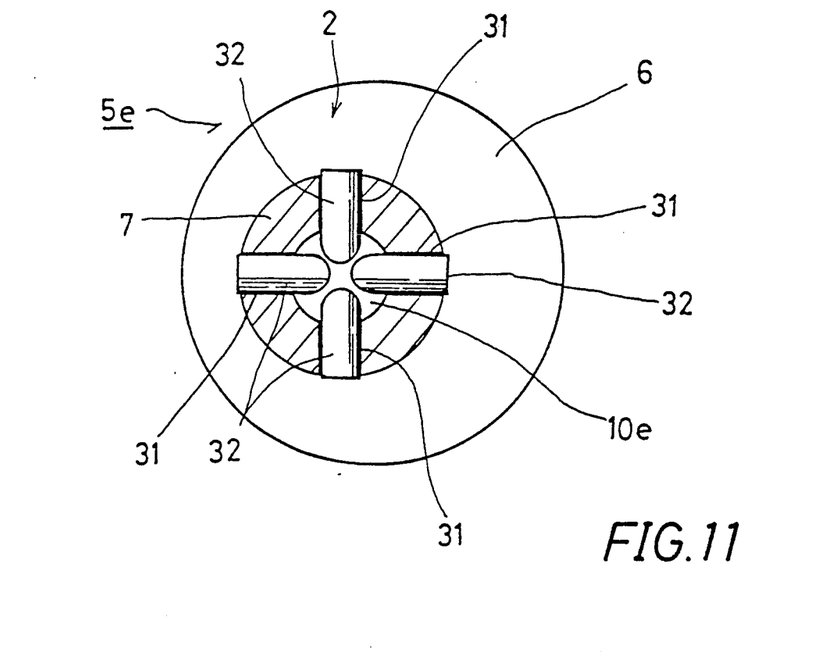
FIG. 11 is a sectional view taken along line XI—XI in FIG. 10.

The fifth embodiment of the present invention will be hereinafter explained in connection with FIGS. 10 and 11. In a device 5e of this embodiment, The shank 7 of the rotational member 2 includes a hole 30 having a diameter smaller than that of the threaded hole 9 and formed in continuation with the threaded hole 9. The hole 30 is closed at the bottom. The shank 7 further includes four radial holes 31 which are equally spaced from each other in a circumferential direction and which communicate with the upper portion of the hole 30. A screw member 10e includes at the lower end thereof a conical projection 34, the diameter of which becomes smaller in a downward direction. A pin 32 is slidably inserted into each of the radial holes 31 and is provided with an end surface 33 at the inner end which is inclined at the same angle as the conical projection 34.

In the above embodiment, as the screw member 10e is rotated to be moved downwardly, the conical projection 34 forces pins 32 to be moved radially outwardly through cooperation of the conical surface of the conical projection 34 with the end surfaces 33 of the pins 32. The pins 32 are thus pressed on the inner surface of the hole H, so that the rotational member 5e can be fixed to the hold H.

While the invention has been described with reference to a preferred embodiment thereof, it is to be understood that modifications or variations may be easily made without departing from the scope of the present invention which is defined by the appended claims.

What is claimed is:

1. A device for fixing a work in position on a base having a protrusion and a hole formed adjacent the protrusion for mounting the device, comprising:

a rotational member mountable in the hole of the base and rotatable around the axis of the hole, said rotational member having a shank insertable into the hole of the base, a head disposed on an upper end of said shank and having a lateral surface for pressing the work against the protrusion, the distance from the rotational axis of said rotational member to said lateral surface being varied in a circumferential direction of said head, an engaging recess formed on said head coaxially with said shank and opened at its upper portion for engagement with a tool for rotating said rotational member, and a threaded hole extending from said head to said shank along the rotational axis of said rotational member and joined to the bottom portion of said engaging recess;

a screw member threadably engaged with said threaded hole of said rotational member and having an engaging portion for engagement with another tool for rotating said screw member, said engaging portion being disposed at the upper end of said screw member and being disposed on an axis of said screw member; and expanding means provided with said shank of said rotational member and operably by said screw member for expanding laterally so as to prohibit rotation of said rotational member in accordance with the axial movement of said screw member;

whereby said screw member can be positioned below said engaging recess when said rotational member is rotated by said tool through engagement with said engaging recess, and said screw member can be rotated by said another tool to operate said expanding means through engagement with said engaging portion via said engaging recess after said rotational member has been rotated to position said lateral surface of said head in contacting relation to the work.

2. The device as defined in claim 1 wherein said engaging portion of said screw member is a recess.

3. The device as defined in claim 1 wherein said expanding means include a plurality of flexible members disposed on said shank in a spaced relation to each other; the upper end of each of said flexible members is fixed to said shank while the lower end thereof is free; and the inner surface of each of said flexible members includes an inclined surface radially outwardly in an upward direction for engagement with the lower end of said screw member, so that said flexible members can be resiliently bent radially outwardly to be pressed on the inner surface of the hole of the base.

4. The device as claimed in claim 3 wherein said flexible members are segments of said shank which are separated from each other by a plurality of slits extending in a radial direction of said shank; said shank includes a conical hole and an axial hole formed in continuation with said threaded hole; said conical hole forms said inclined surface; and said axial hole has a diameter smaller than that of said threaded hole and is opened at its lower end.

5. The device as claimed in claim 1 wherein said threaded hole of said rotational member is opened at the lower end of said shank; said screw member extends downwardly from said shank and includes a head portion having a diameter larger than that of the shank; said expanding means include a resilient member interposed between said head portion of said screw member and the lower end of said shank; and said resilient member can be compressed to be pressed on the inner surface of the hole of the base as said screw member is moved upwardly.

6. The device as claimed in claim 5 wherein said resilient member is an annular rubber having relatively large thickness.

7. The device as defined in claim 5 wherein said resilient member is a belleville spring.

8. The device as defined in claim 1 wherein said threaded hole of said rotational member is opened at the lower end of said shank; said screw member extends downwardly from said shank and includes a head portion having a diameter larger than that of the shank; the outer surface of said shank is formed to have a conical configuration the diameter of which becomes smaller in a downward direction; and said expanding means include a tubular member supported by said head portion of said screw member and having a conical inner surface the inclined angle of which is the same as that of the outer surface of said shank for engagement therewith, so that said tubular member can be expanded through cooperation of the inner surface thereof with the outer surface of said shank so as to be pressed on the inner surface of the hole of the base as said screw member is moved upwardly.

9. The device as defined in claim 1 wherein said shank of said rotational member includes a plurality of radial holes connecting said engaging hole with the outside; said screw member includes at the lower end thereof a conical projection the diameter of which becomes smaller in a downward direction; said expanding means include a plurality of pins slidably inserted into said radial holes; and each of said pins includes at the inner end thereof an inclined surface inclined at the same angle as said conical projection for engagement therewith, so that said pins can be moved radially outwardly to be pressed on the inner surface of the hole of the base through cooperation of said inclined surface with said conical projection as said screw member is moved downwardly.

10. The device as claimed in claim 1 wherein said head of said rotational member has a disc-like configuration and is eccentrically positioned relative to said shank.

11. The device as claimed in claim 1 wherein the device is utilized to fix the position of a linear guide rail as the work.

* * * * *